United States Patent
Beisswenger et al.

[11] Patent Number: 5,215,042
[45] Date of Patent: Jun. 1, 1993

[54] FLUIDIZED BED REACTOR

[75] Inventors: Hans Beisswenger, Bad Soden; Rainer Reimer, Idstein; Karel Vydra, Bad-Nauheim, all of Fed. Rep. of Germany

[73] Assignee: Metallgesellschaft Aktiengesellschaft, Frankfurt, Fed. Rep. of Germany

[21] Appl. No.: 645,379

[22] Filed: Jan. 18, 1991

[30] Foreign Application Priority Data

Feb. 20, 1990 [DE] Fed. Rep. of Germany ....... 4005305

[51] Int. Cl.$^5$ .............................................. F22B 1/00
[52] U.S. Cl. ..................................... 122/4 D; 110/245
[58] Field of Search ................. 110/245, 216; 122/4 D

[56] References Cited

U.S. PATENT DOCUMENTS

| 4,165,717 | 8/1979 | Reh et al. | 110/245 |
| 4,330,502 | 5/1982 | Engstrom | 110/245 |
| 4,424,766 | 1/1984 | Boyle | 110/245 |
| 4,672,918 | 6/1987 | Engstrom et al. | 110/245 |
| 4,732,113 | 3/1988 | Engstrom | 122/4 D |
| 4,736,711 | 4/1988 | Marlair et al. | 110/245 |
| 4,815,418 | 3/1989 | Maeda et al. | 110/245 |
| 4,951,612 | 8/1990 | Gorzegno | 122/4 D |
| 5,005,528 | 4/1991 | Virr | 110/245 |

FOREIGN PATENT DOCUMENTS 0152529  8/1985  European Pat. Off. .
3519159  12/1986  Fed. Rep. of Germany .
8706678  11/1987  PCT Int'l Appl. .

OTHER PUBLICATIONS

JP-A 62-123121, "Control of Temperature in Fluidized Red Combustion Boiler", Patent Abstracts of Japan, V. 11 (Kawasaki) (Nov. 1987).

Primary Examiner—Henry C. Yuen
Attorney, Agent, or Firm—Sprung Horn Kramer & Woods

[57] ABSTRACT

A reactor for combusting fine-grained solid fuels in a circulating fluidized bed contains a combustion chamber, which is provided with lines which open in the lower portion of that chamber and serve to feed primary air, secondary air and solid fuel. The fluidized bed combustion chamber is divided into compartments by at least one partition provided in the upper portion of the fluidized bed combustion chamber. Each compartment communicates through a passage with at least one solids separator, which is connected to means for recycling solids and communicates with the compartment through a passage.

10 Claims, 2 Drawing Sheets

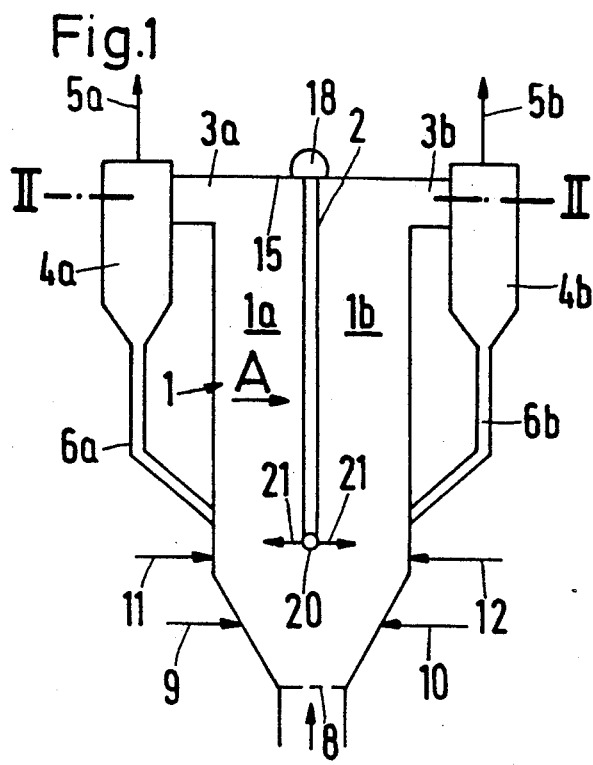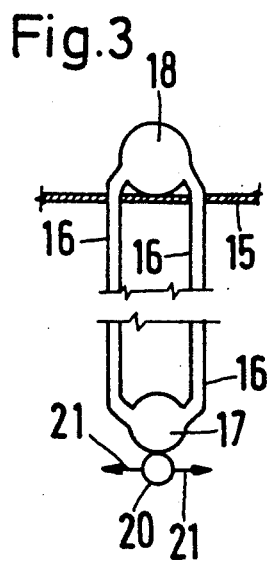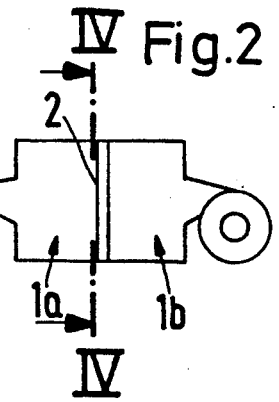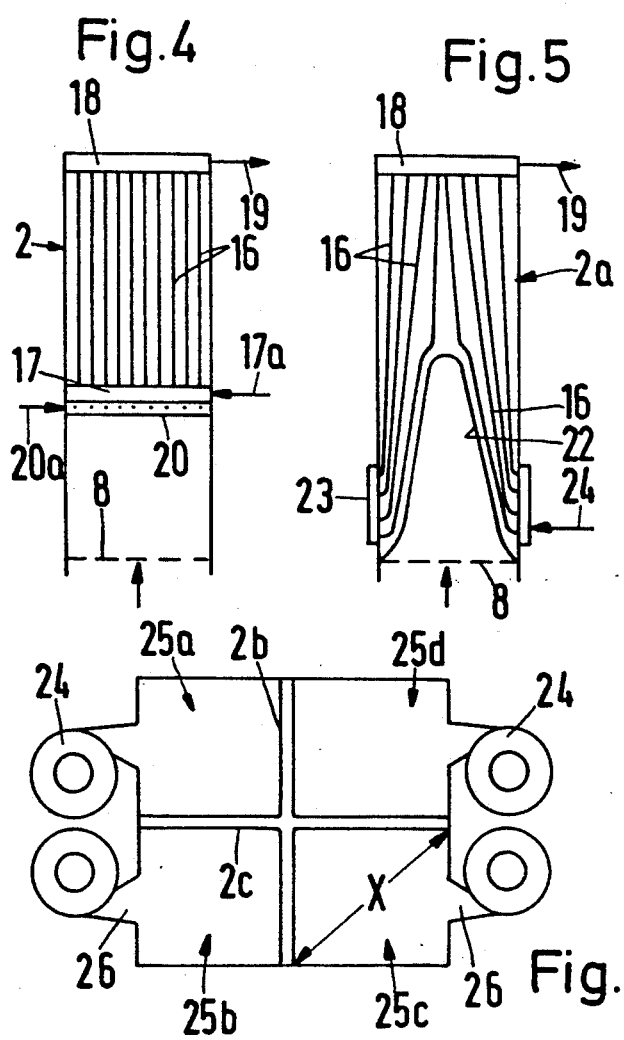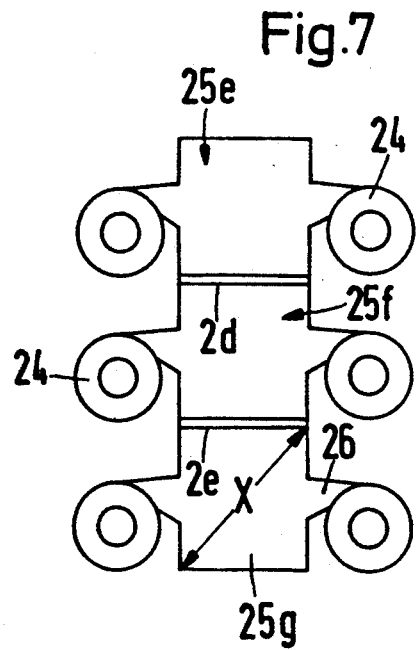

FLUIDIZED BED REACTOR

DESCRIPTION

This invention relates to a reactor for combusting fine-grained solid fuels in a circulating fluidized bed, comprising a fluidized bed combustion chamber, which is provided with lines opening into said chamber in its lower portion and serving to feed primary air, secondary air and solid fuel, also comprising means for separating solids within or outside the fluidized bed combustion chamber, a passage, through which the upper portion of the fluidized bed combustion chamber communicates with the means for separating solids, and means for recycling solids from the means for separating solids to the lower portion of the fluidized bed combustion chamber.

Reactors of the kind used to combust solid fuels in a circulating fluidized bed are known. Details have been described, e.g., in German Patent 25 39 546 and in the corresponding U.S. Pat. No. 4,165,717. Particularly in fluidized bed combustion chambers having a large cross-sectional area it is difficult to establish particularly in the upper portion of the fluidized bed combustion chamber a distribution of the gases and solids which is as uniform as possible. Such an approximately uniform distribution of solids and gases is desirable for permitting an effective desulfurization of the flue gases and generally for a high utilization of energy as the heat transfer to a cooled wall is known to depend strongly on the concentration of solids.

It is an object of the invention to achieve in the fluidized bed combustion chamber, even if it is large in cross-section, flow conditions which are as uniform as possible and, as a result, a distribution of gas and solids which is as uniform as possible. In a reactor which is of the kind described first hereinbefore this is accomplished in accordance with the invention in that the fluidized bed combustion chamber is divided into at least two compartments by at least one partition provided in the upper portion of the fluidized bed combustion chamber and at least one solids separator provided with solids-recycling means is associated with each compartment. It is essential that each compartment communicates with a solids separator, such as a cyclone, which is provided inside or outside the fluidized bed combustion chamber so that approximately the same flow conditions will be established in the compartments.

The partition is preferably so arranged that the compartments have approximately the same area in horizontal cross-section. In that case the flow rising from the lower portion of the fluidized bed combustion chamber will generally be approximately uniformly distributed to the compartments without a need for an additional expenditure.

For certain purposes it may be desirable not only to provide the partition (or partitions) but to control the gas streams leaving the solids separators by valve means, such as flap valves, in such a manner that equal flow conditions are established in the compartments defined by the partition so that a still more uniform distribution of gas and solids is achieved.

Various design details may desirably be adopted for the partition, which is mainly disposed in the upper portion of the fluidized bed combustion chamber. In the upper portion of the fluidized bed combustion chamber that wall will be entirely or substantially impermeable to gas so that disturbing cross-currents between the compartments will be avoided as far as possible. On the other hand, the partition will have at least one large aperture in the lower portion of the fluidized bed combustion chamber so that the flow can have also a horizontal component of motion in that region and non-uniformities will soon be eliminated.

It will be desirable to provide the partition with cooling surfaces for a dissipation of additional heat. It will also be desirable to install in the partition at least one line provided with a manifold and serving to feed combustion air to the compartments. In that case that region, which is only difficultly accessible to the secondary air coming from the outside, will also effectively be flown through by the combustion air. Lines for feeding fuel and/or chemicals, such as calcium compounds, may also extend from the partition. Such chemicals can be used in known manner to bind disturbing components of the gas.

Optional features of the reactor will be explained with reference to the drawing, in which only the most important details are diagrammatically shown.

FIG. 1 is a longitudinal sectional view showing the reactor.

FIG. 2 is a transverse sectional view taken on line II—II in FIG. 1 and showing the reactor.

FIG. 3 is a longitudinal sectional view which is similar to FIG. 1 and shows a partition consisting of cooling tubes.

FIG. 4 is a longitudinal sectional view taken on line IV—IV in FIG. 2 and showing the fluidized bed combustion chamber.

FIG. 5 is a longitudinal sectional view which is similar to FIG. 4 and shows another embodiment of the partition.

FIG. 6 is a transverse sectional view showing a fluidized bed combustion chamber which contains crossed partitions.

FIG. 7 is a transverse sectional view showing a fluidized bed combustion chamber which contains parallel walls.

Figure 8:
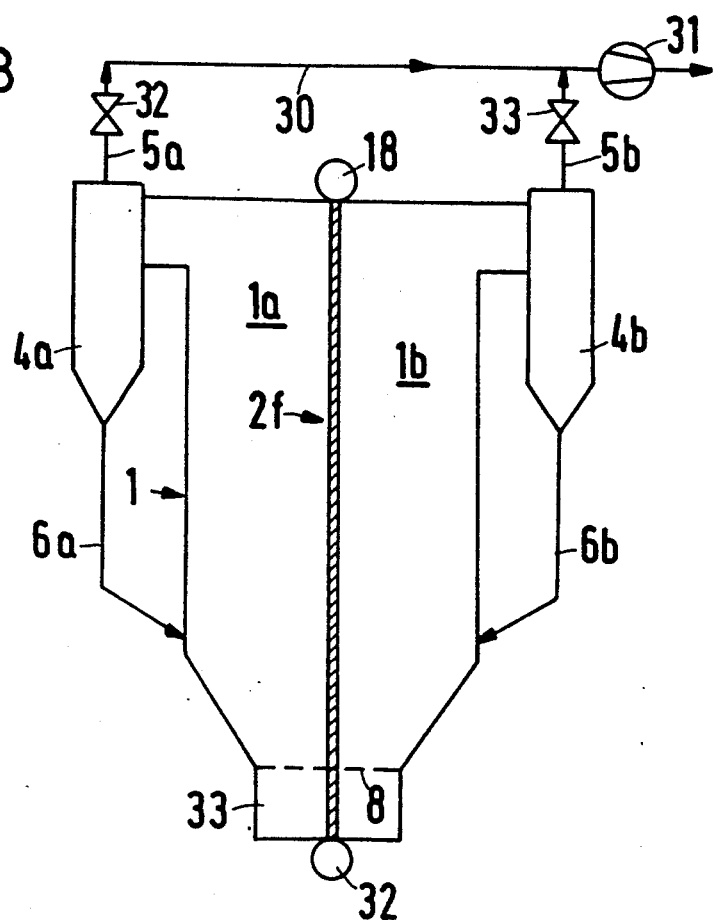
FIG. 8 is a longitudinal sectional view which is similar to FIG. 1 and shows a modification of the reactor.

The reactor shown in FIG. 1 comprises a fluidized bed combustion chamber 1 and a vertical partition 2 centered in said chamber. The partition defines two compartments 1a and 1b, see also FIG. 2. A duct 3a or 3b leads from the top end of each compartment to a cyclone 4a or 4b, which constitutes means for separating solids from the gas stream. Gases leave the cyclones 4a and 4b through lines 5a and 5b and the separated solids flow through the recycling lines 6a and 6b back to the lower portion of the fluidized bed combustion chamber 1.

Through a grate 8 provided at the bottom of the fluidized bed combustion chamber, primary air for fluidizing the granular solids and for combusting them is blown into the chamber. Fine-grained fuels, particularly coal, is fed through lines 9 and 10. Secondary air is blown into the fluidized bed combustion chamber 1 through a relatively large number of lines, of which only the lines 11 and 12 are shown in the drawing. The fluidized bed combustion chamber tapers downwardly between the secondary air lines 11 and 12 and the grate 8. The walls defining the fluidized bed combustion chamber may be provided with cooling tubes, which are not shown on the drawing for the sake of clarity.

As shown in FIGS. 1 and 2 the partition 2 extends down from the top wall 15 of the fluidized bed combustion chamber 1 as far as to the level of the outlets of the secondary air lines 11 and 12, but the bottom end of the partition 2 may be disposed on various levels. As soon as the solids concentration in one compartment 1a or 1b exceeds the solids concentration in the other compartment, the resistance to flow in the former compartment will be increased and the flow coming from the lower portion of the fluidized bed combustion chamber will find the path of least resistance through the other compartment. As a result, any difference between the solids concentrations will be eliminated so quickly that an occurrence of disturbing differences in concentration will be avoided. For that purpose it is essential that the compartments are rather similar in design from the aspect of aerodynamics and each compartment is similarly provided with a duct 3a or 3b and an associated solids separator 4a or 4b. The cross-sectional shape of the fluidized bed combustion chamber and the arrangement of the partition 2 are suitably so chosen that compartments having about the same cross-sectional area are obtained, see FIG. 2. It is not essential for the fluidized bed combustion chamber to have in its upper portion a rectangular shape in cross-section, as is shown in FIGS. 1 and 2. Alternatively, the cross section may be more or less elliptical and may be divided by a partition 2 although that is not shown in the drawing.

The partition may serve for further purposes for improving the utilization of energy. For instance, the partition may consist of approximately vertical cooling tubes 16, see FIG. 3, which extend between a feed water header 17 and a steam header 18, which is preferably disposed over the top wall 15 of the fluidized bed combustion chamber, see also FIG. 1. Adjacent cooling tubes are interconnected to constitute a closed wall, which may consist of a double wall as shown in FIG. 3.

The partition 2 may also be used to feed combustion air from the outside into the compartment 1a and 1b. In the embodiment shown in FIGS. 1 and 3 an air line 20 provided at the bottom end of the partition serves to feed air, which is blown from the outside by a fan, not shown. The line 20 is provided with nozzles, through which the air emerges into the compartments at various locations, as is indicated by arrows 21. The partition 2 may be provided with lines for feeding combustion air at various locations so that air may be supplied to the compartments 1a and 1b wherever this is desired; this is not shown in the drawing. As a result, the fuel can be combusted in the compartments to a high degree regardless of the diameter of the fluidized bed combustion chamber.

A line which is comparable to line 20 (or a plurality of such lines) may be used to feed additional fuel and/or chemicals, such as calcium compounds, for binding disturbing gas components, into the compartments. Such lines have been omitted in the drawing for the sake of clarity.

FIG. 4 is a front elevation showing the partition 2 viewed in the direction of the arrow A in FIG. 1. The steam header 18 provided with a steam discharge line 19, the vertical cooling tubes 16, which constitute a closed wall 2, the feed water line 17a leading to the manifold 17 and the air line 20a leading to the air manifold 20 shows a lot of points which mean that The air manifold 20 is indicated by dotted lines because it is provided with air discharge nozzles. It is apparent from FIG. 4 that the partition 2 extends only into a part of the lower portion of the fluidized bed combustion chamber 1. Lines for feeding fuel and secondary air have not been shown in the drawing.

In the embodiment shown in FIG. 5 the partition 2a extends into the tapered lower portion of the fluidized bed combustion chamber 1 and in that region has a gatelike large aperture 22. Such a large aperture or a plurality of smaller apertures are required to ensure that in the lower portion of the fluidized bed combustion chamber the flow can have not only a vertical component but also a horizontal component of motion so that a more uniform concentration of solids will be established in the upper portion of the fluidized bed combustion chamber. The partition 2a in FIG. 5 is provided with an annular cooling water manifold 23, which is fed with cooling water from line 24. The water vapor formed in the cooling tubes 16 enters the header 18 and leaves it through line 19 for further use. The partition 2a may be provided with lines for feeding combustion air, fuel and/or chemicals; said lines are not shown in the drawing.

For very large fluidized bed combustion chambers having an extremely large cross-sectional area it is recommendable to provide a plurality of partitions, which define a plurality of combustion chambers. In accordance with FIG. 6 the crossed partitions 2b and 2c define four compartments 25a, 25b, 25c and 25d and a cyclone 24 provided with a communicating duct 26 is associated with each compartment. A recycle line is connected to each cyclone and serves to feed separated solids to the fluidized bed combustion chamber just as in accordance with FIG. 1.

In the embodiment shown in FIG. 7 the fluidized bed combustion chamber is rectangular in cross-section and is divided by two parallel partitions 2d and 2e into three compartments 25e, 25f and 25g. It is also shown there that two or more separators rather than only one separator may be associated with each compartment. In this case the two cyclones 24 associated with each compartment are opposite to each other.

Each compartment has a largest horizontal diagonal, which is designated X in FIGS. 6 and 7. Partitions are particularly desirably used only in fluidized bed combustion chambers which are large in cross-section and in that case the largest horizontal diagonal X of each compartment has a length of at least 3 meters and preferably at least 5 meters. Fluidized bed combustion chambers of that size can be used in power plants for generating more than 100 megawatts of electric power.

Figure 9:
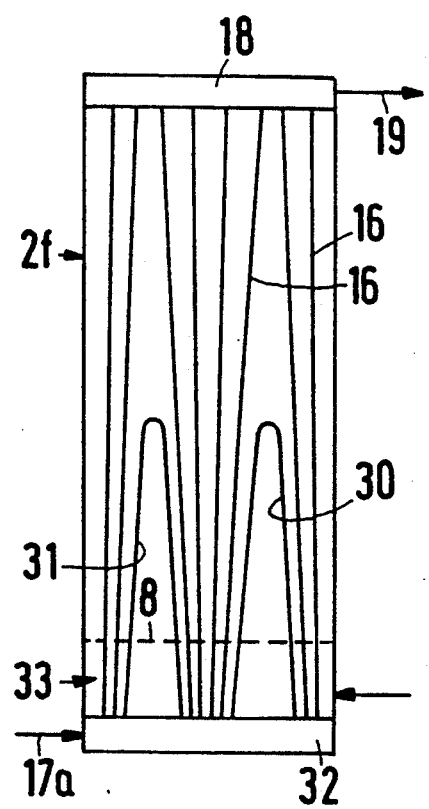
FIG. 9 is a longitudinal sectional view which is similar to FIG. 4 and shows the reactor of FIG. 8.

The fluidized bed combustion chamber shown in FIGS. 8 and 9 is divided by a vertical partition 2f, which is provided with cooling tubes 16 and extends in part below the grate 8. The partition is formed in its lower portion with two gatelike apertures 30 and 31 and the cooling tubes extend past said apertures to feed a water header 32, which is disposed below a chamber 33, from which the primary air rises through the grate 8. In that embodiment the steam header 18 and the feed water header 32 are also disposed outside the fluidized bed combustion chamber and the fuel lines and lines for feeding secondary air or chemicals also have not been shown. It is also indicated in FIG. 8 how the gases coming from the solids separators 4a and 4b and flowing in lines 5a and 5b are discharged through a manifold 30 and a fan 31. Controllable valves 32 and 33 may be provided to ensure that the flow conditions in the compartments 1a and 1b will be as uniform as possible.

It will be understood that the specification and examples are illustrative but not limitative of the present invention and that other embodiments within the spirit and scope of the invention will suggest themselves to those skilled in the art.

What is claimed is:

1. A reactor for combusting fine-grained solid fuels in a circulating fluidized bed, comprising a fluidized bed combustion chamber, which is provided with lines opening into said chamber in its lower portion and serving to feed primary air, secondary air and solid fuel, the fluidized bed combustion chamber being divided into at least two compartments by at least one vertical partition provided in the upper portion of the fluidized bed combustion chamber, at least one solids separator provided with solids-recycling means associated with each compartment, said solids-recycling means recycling solids to the lower portion of the combustion chamber, the partition is substantially impermeable to gas in the upper portion of the fluidized bed combustion chamber, the partition has at least one large aperture in the lower portion of the fluidized bed combustion chamber, the partition comprises cooling tubes and the partition is provided with at least one line which is provided with a distributing manifold and serves to feed combustion air into the compartments.

2. A reactor according to claim 1, wherein the compartments have approximately the same horizontal cross-sectional area.

3. A reactor according to claim 1, wherein the partition has at least one large aperture in the lower portion of the fluidized bed combustion chamber.

4. A reactor according to claim 1, wherein the partition comprises cooling tubes.

5. A reactor according to claim 1, wherein the partition is provided with at least one line for feeding fuel.

6. A reactor according to claim 1, wherein the partition is provided with at least one line for feeding chemicals.

7. A reactor according to claim 1, wherein the largest horizontal diagonal in each compartment is at least 3 meters long.

8. A reactor according to claim 1, wherein the fluidized bed combustion chamber is divided into four compartments by two crossed partitions.

9. A reactor according to claim 1, wherein the fluidized bed combustion chamber is divided into three compartments by two parallel partitions.

10. A reactor according to claim 1, wherein the lower portion of the fluidized bed combustion chamber tapers downwardly.

* * * * *